United States Patent [19]

Tworek et al.

[11] 4,309,248
[45] Jan. 5, 1982

[54] PROCESS FOR MANUFACTURING BORON NITRIDE FIBER MATS USING CALENDER ROLLS

[75] Inventors: John L. Tworek, West Seneca; Gordon R. Rignel, Clockport, both of N.Y.

[73] Assignee: Kennecott Corporation, Stamford, Conn.

[21] Appl. No.: 134,896

[22] Filed: Mar. 28, 1980

[51] Int. Cl.³ .............................................. D21F 11/00
[52] U.S. Cl. .................................. 162/157 R; 162/201; 162/206; 162/207; 264/65; 264/319; 264/332
[58] Field of Search .................... 162/146, 157 R, 201, 162/206, 207, 152, 102; 423/290; 428/366; 264/8, 65, 319, 332; 106/55; 65/6–8, 2, 4 R, 9, 32, 30 R

[56] References Cited

U.S. PATENT DOCUMENTS

| | | | |
|---|---|---|---|
| 2,888,325 | 5/1959 | Taylor | 423/290 |
| 3,429,722 | 2/1969 | Economy et al. | 106/55 |
| 3,816,242 | 6/1974 | Selover et al. | 162/157 R |
| 3,837,997 | 9/1974 | Economy et al. | 428/366 |
| 4,075,276 | 2/1978 | Economy et al. | 264/332 |
| 4,125,450 | 11/1978 | Degueldre et al. | 204/296 |
| 4,130,631 | 12/1978 | Hamilton | 423/290 |

Primary Examiner—Peter Chin
Attorney, Agent, or Firm—John L. Sniado; Anthony M. Lorusso

[57] ABSTRACT

A process is disclosed for producing a non-woven, boron nitride-bonded boron nitride fiber mat, suitable for use as an electric cell separator in a lithium-sulfide battery. A web having a combination of structural boron nitride (BN) fibers and interstitial, thermally bondable boron oxide ($B_2O_3$) fibers is passed through the nip of a pair of cooperating calender rolls at an appropriate temperature and pressure to soften the boron oxide binder throughout the web to fuse the BN fibers together. The interstitial boron oxide then is heated in an anhydrous ammonia atmosphere to convert it into boron nitride.

10 Claims, 1 Drawing Figure

PROCESS FOR MANUFACTURING BORON NITRIDE FIBER MATS USING CALENDER ROLLS

BACKGROUND OF THE INVENTION

The invention relates generally to boron nitride fibers and more particularly to a process for producing integral boron nitride-bonded boron nitride fiber mats.

Boron nitride (BN) possesses a number of highly desirable properties which render it useful in a wide variety of applications. Its high electrical resistivity, coupled with its high thermal conductivity, make it especially useful in electrical and electronic applications requiring a material which simultaneously acts as an electrical insulator and a thermal conductor. Its excellent thermal shock resistance renders it effective as a refractory at temperatures up to 1600° C. or higher in a non-oxidizing atmosphere and at temperatures as high as 700° to 900° C. in air. It is highly corrosion resistant, being inert to most organic liquids and many corrosive chemicals and displaying excellent resistance to attack by various molten metals. Furthermore, because of its low dissipation factor over a wide temperature range, this material is well suited for use in microwave and radar dielectric components (radar windows).

Various methods for the manufacture of boron nitride fibers are known in the prior art; for example, it is disclosed in U.S. Pat. No. 3,429,722, issued to James Economy et al., that boron nitride fibers can be manufactured by heating boron oxide fibers in an ammonia atmosphere, a process known generally as nitriding.

While it is well known in the prior art that boron nitride fibers can be manufactured having good characteristics, the use of such fibers has been limited due to difficulties in forming three dimensional articles from the fibers. U.S. Pat. No. 3,816,242 to Selover et al. teaches a process for binding BN fibers into a felt using an aqueous solution of an inorganic, water soluble material as the binder. However, almost any substance other than BN which is used to bond the fibers to each other has properties which are inferior to the properties of the boron nitride fibers, thus resulting in a bonded article which is unsuitable for use in many applications. For example, when a boron nitride fiber mat, which is bound by prior art materials, is used as an electric cell separator in a lithium sulfide battery utilizing a corrosive cell electrolyte, such as molten lithium chloride or potassium chloride, the fibers separate from each other due to the inability of the binding material to withstand the high temperature corrosive environment.

An attempt has been made prior to the present invention to form articles from boron nitride-bonded boron nitride fibers, for example, by heating boron nitride fibers impregnated with boric acid solution to elevated temperatures in ammonia as disclosed in U.S. Pat. No. 3,837,997 to James Economy et al.

In addition to the above-noted references relating to boron nitride fibers, shaped boron nitride, usually non-porous, bodies have also been prepared in the past. Such articles are disclosed, for example, by Taylor, U.S. Pat. No. 2,888,325, which teaches the use of a multiple stage nitriding process comprising intermittent addition of oxygen-containing boron compound at intermediate stages of nitriding, followed by further nitriding. Furthermore, such articles have been prepared by sintering boron nitride fibers in the presence of boron oxide.

U.S. Pat. No. 4,130,631, assigned to the same assignee as the present application, does disclose a method for producing a non-woven porous boron nitride fiber mat having sufficient strength for use as an electric cell separator in the above mentioned molten lithium chloride environment. However, despite the superior physical characteristics of the resulting product, this method is not sufficiently detailed to insure an economically feasible operation.

Therefore, it is an object of the present invention to provide a process to produce boron nitride-bonded fiber mats from a web containing structural glass fibers and boron oxide, and to do so in a commercially feasible manner.

SUMMARY OF THE INVENTION

In a process for producing a boron nitride-bonded vitreous fiber mat, from a web having a dispersion of vitreous fibers with interstitial thermally bondable boron oxide fibers, the web is passed through the nip of a cooperating pair of calender rolls, at least one of which rolls is heated to a temperature sufficient to soften the boron oxide fibers. The softened boron oxide fibers throughout the web fuse together the vitreous fibers. The calendered web is heated in an anhydrous ammonia atmosphere at a sufficient temperature for a sufficient time to convert essentially all of the interstitial boron oxide into boron nitride.

BRIEF DESCRIPTION OF THE DRAWINGS

The several features and advantages of this process for manufacturing boron nitride felt mats in accordance with the invention, will be more readily understood and appreciated from the following detailed description of the preferred embodiments, as shown in the accompanying drawings in which.

DESCRIPTION OF THE PREFERRED EMBODIMENT

Figure 1:
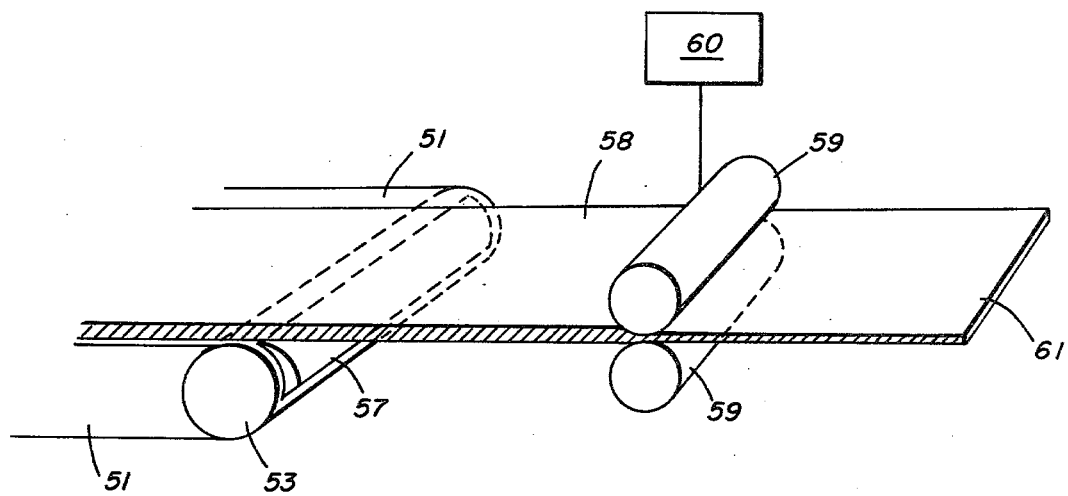
FIG. 1 is a side perspective view, in a diagrammatic form, of the hot calender rolls system for bonding a web in accordance with the present invention.

The process in accordance with the present invention operates on raw material in the form of an integrated mass of accumulated vitreous fibers, such as glass or ceramic fibers, having interstitially located, thermally bondable boron oxide ($B_2O_3$) fibers dispersed throughout the mass. The function of the boron oxide fibers, as hereinafter described in greater detail, is to bind together the glass or ceramic fibers, which other fibers, since they generally constitute the greater percentage of the total mass, are referred to here as the structural fibers. The distribution of the structural and the binder fibers within the finished product and the relative percentages of each, will be determined by the distribution and the respective percentages present in the initial mass.

It is intended that the structural vitreous fibers can be, for example, any type of glass or ceramic material compatible with, and capable of bonding to, the boron oxide fibers, and which can withstand, without decomposing, the temperatures necessary to convert the boron oxide into boron nitride (BN). However, because of the particular utility of boron nitride-bonded boron nitride fiber mats as electric cell separators in lithium sulfide batteries, the structural fibers in the following described embodiments are selected with such an end product in mind.

One particularly suitable mass of structural and boron oxide fibers for use in the present process is the fully nitrided boron nitride fiber and boron oxide fiber felt produced by a process disclosed in a companion U.S. Patent application, by the same inventors as herein, for PROCESS FOR MANUFACTURING BORON NITRIDE FIBER FELT USING A FOURDRINIER MACHINE. There, quantities of BN and $B_2O_3$ fibers are blended with a nonaqueous liquid medium to form a homogeneous slurry which is processed through a Fourdrinier machine into a coherent, boron oxide-bonded felt. In a preferred embodiment of this felt, there are 50–99% by weight of BN fibers and 1–50% by weight of $B_2O_3$ fibers, with the fibers ranging in length from 0.1 inch to 1.0 foot, and having a maximum diameter of about 10 microns.

Referring now to FIG. 1, a felt 58 of BN and $B_2O_3$ fibers is fed into the nip of a cooperating pair of calender rolls 59. At least one of the calender rolls is heated, for example, by steam supplied to its hollow interior or by electrical resistance elements, to a temperature sufficient to soften the interstitial boron oxide fibers. The temperature may be raised even to a level above the 460° C. melting point of the boron oxide; roll temperatures from about 200° C. to 900° C. are preferred. The calender rolls are fixed at a constant gap across the width of the felt and exert a pressure of from 1–100 lbs. per square inch, to soften the boron oxide within the interstices of the boron nitride fibers, to fuse the boron nitride fibers together into a structure more strongly cohesive than the uncalendered felt. Typically a felt 58 directly from a Fourdrinier machine, having an average tensile strength from 0–10 psi will have its tensile strength increased to about 0.1–30 psi by the calendering. An adjustment 60 effects changes in the separation between the two rolls, to control the thickness, or loft, of the felt. What emerges from the nip of the calender rolls is a boron oxide-bonded boron nitride fiber mat 61.

The next step in the present process is the nitriding and stabilization of the bonded felt to convert the interstitial boron oxide binder into boron nitride. In the case of a felt containing 50–99% (by weight) of fully nitrided boron nitride fiber and 1–50% (by weight) of boron oxide fibers, the bonded felt is heated in an anhydrous ammonia atmosphere at a final nitriding temperature from about 200° C. to 900° C. for about 2 to 72 hours to yield the desired physical properties. The flow of $NH_3$ through the reaction chamber is maintained at 0.01 to 3.3 liter/min/gram of $B_2O_3$ fiber in the felt. For stabilization purposes, and to enhance the corrosion resistance of the finished mat, as disclosed more fully in the above referenced U.S. Pat. No. 3,429,722 patent, the fully nitrided mat can be heated in an inert atmosphere at a temperature which may be below, but which is usually above, the final nitriding temperature. For example, heating within a dry nitrogen ($N_2$) atmosphere at 2000° C. will adequately stabilize the fibers and increase their corrosion resistance. Upon completion of stabilization, the nitride-bonded felt can be cut into shapes and sizes appropriate for the applications in which it will be used, for example, as battery cell separator felts in lithium sulfide batteries.

Although in this preferred embodiment the uncalendered felt was made from a slurry containing fully nitrided boron nitride fibers and boron oxide fibers, the boron nitride fibers alternatively could have been only partially nitrided before blending into the slurry with the remaining nitride conversion occuring during the above described nitriding and stabilization step of the present process. In such a case, the nitriding and stabilization temperatures and time durations are adjusted accordingly. With this in mind, the present process also can be practiced using uncalendered felt containing the following types of fibers: partially nitrided boron nitride fibers and boron oxide fibers; 100% boron oxide fibers; combinations of the above with or without fillers.

For a felt containing 100% boron oxide fibers, for example, the nitriding step typically is as follows. As disclosed in more detail in U.S. Pat. No. 3,429,722 to Economy et al. (having a common assignee as the present application, and which is incorporated here by reference), the temperature of the bonded boron oxide felt is raised from room temperature to a final temperature between about 700° to 1100° C. at a rate of from 5° to 100° C. per hour. The flow of ammonia through the reaction chamber is maintained at 0.01 to 3.3 liter/min/gram of $B_2O_3$ fiber being reacted. Nitriding time may range between 10 hours to 100 hours. As the temperature increases, two intermediate stages of reaction occur. The first reaction which occurs is that of adding a protective shield of a nitrogen and hydrogen containing composition to the outer surface of the $B_2O_3$ fiber. This shield not only retains the fibrous form, but also prevents fusing of the fibers together. Such addition reaction extends from room temperature up to about 250°–300° C. Above about 300° C. and up to about 500° C. the $B_2O_3$ fiber, if having a maximum diameter of not more than about 10 microns, develops a highly porous structure, accompanied by a weight loss and the giving off of water vapor according to the general equation. $B_2O_3 + 2NH_3 = 2BN + 3H_2O$. Thus, the $NH_3$ is able to penetrate substantially throughout the thickness of the $B_2O_3$ fiber, allowing the boron, nitrogen, hydrogen and oxygen to react, and begin the formation of various intermediate boron and nitrogen containing compositions.

The heated calender rolls 59 also can be used to bond together a pure boron oxide fiber bundle, for example, the boron oxide fiber batts produced by a process disclosed in a companion U.S. patent application, Ser. No. 134,905, filed on even date herewith, by the same inventors as herein, for PROCESS FOR MANUFACTURING BORON NITRIDE FIBER BATTS USING A SPINNER, which application is hereby incorporated by reference. In that process molten $B_2O_3$ is centrifugally extruded into strands which are attenuated into staple $B_2O_3$ fibers by an annular stream of gases. The fibers are buffeted by a turbulent air flow which produces random orientations and mechanical intertwining of the fibers. In such a case, the heat and pressure applied by the rolls will soften all the component fibers to multiply the number of fiber-to-fiber bonds within the batt to improve its cohesiveness, increase its density, and produce the mat-like shape. Then the totally fused boron oxide may can be nitrided all at once, for example, as in the case of the 100% boron oxide fiber felt discussed above.

Although the foregoing disclosure illustrates the advantages and features of the novel manufacturing process in accordance with the present invention, it may be obvious to those skilled in the art to effect various modifications or changes to the present invention, without departing from the spirit thereof. The scope of the present invention is to be determined by the following claims.

We claim:

1. A process for producing a boron nitride-bonded vitreous fiber mat from a web having a dispersion of said vitreous fibers with interstitial thermally bondable boron oxide fibers, comprising the steps of:

passing said web through the nip of a cooperating pair of calender rolls, at least one of which said rolls is heated to a temperature sufficient to soften said boron oxide fibers, so as to fuse together said vitreous fibers; and heating the calendered web in an anhydrous ammonia atmosphere at a sufficient temperature for a sufficient time to convert essentially all of said interstitial boron oxide into boron nitride.

2. The process as set forth in claim 1, wherein the temperature of said at least one of said calender rolls is from about 200° C. to about 900° C.

3. The process as set forth in claim 1, wherein said calender rolls exert a pressure of from 1 to 100 pounds per square inch on said web.

4. The process as set forth in claim 1, wherein said sufficient temperature to convert said boron oxide fibers to boron nitride is from about 700° C. to about 1100° C. and said sufficient time to convert said boron oxide fibers to boron nitride is from about 10 to about 100 hours.

5. The process as set forth in claim 1, wherein said vitreous fibers are boron nitride fibers.

6. The process as set forth in claim 1, wherein said vitreous fibers are boron oxide fibers.

7. The process as set forth in claim 1, wherein said vitreous fibers are partially nitrided boron nitride fibers.

8. The process as set forth in claim 5, wherein said web comprises by weight about 50-99% of boron nitride fibers and about 1-50% of boron oxide fibers.

9. The process as set forth in claim 8, wherein said sufficient temperature to convert said boron oxide fibers to boron nitride is from about 200° C. to about 900° C. and said sufficient time to convert said boron oxide fibers to boron nitride is from about 2 to about 72 hours.

10. The process as set forth in claim 9 further comprising the step of heating the boron nitride fiber mat in a dry nitrogen atmosphere at 2000° C., whereby the corrosion resistance of the fibers is enhanced.

* * * * *